(12) United States Patent
Greif et al.

(10) Patent No.: US 10,939,080 B2
(45) Date of Patent: Mar. 2, 2021

(54) TRAJECTORY ESTIMATION FOR A MEMS REFLECTOR

(71) Applicant: Facebook Technologies, LLC, Menlo Park, CA (US)

(72) Inventors: Daniel Guenther Greif, Redmond, WA (US); James Laudolff, Issaquah, WA (US); Ziv Magoz, Seattle, WA (US); Stephen John Holmes, Redmond, WA (US); Taha Masood, Sammamish, WA (US); Scott Charles McEldowney, Redmond, WA (US); Jonathan Robert Peterson, Woodinville, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/407,983

(22) Filed: May 9, 2019

(65) Prior Publication Data
US 2020/0314395 A1    Oct. 1, 2020

Related U.S. Application Data

(60) Provisional application No. 62/826,368, filed on Mar. 29, 2019.

(51) Int. Cl.
*G09G 5/00* (2006.01)
*H04N 9/31* (2006.01)
(Continued)

(52) U.S. Cl.
CPC ....... *H04N 9/3135* (2013.01); *G02B 26/0841* (2013.01); *G02B 26/101* (2013.01);
(Continued)

(58) Field of Classification Search
CPC .. H04N 9/3135; H04N 9/3155; H04N 9/3191; G06N 20/00; G06N 3/08;
(Continued)

(56) References Cited

U.S. PATENT DOCUMENTS

| 6,061,163 A | 5/2000 | Melville |
|---|---|---|
| 2004/0119002 A1 | 6/2004 | Bush et al. |

(Continued)

OTHER PUBLICATIONS

Wang et al. "UKF-based MEMS micromirror angle estimation for LiDAR", Journal of micromechanics & Microengineering, vol. 29, No. 3, Jan. 21, 2019.

(Continued)

*Primary Examiner* — Jennifer T Nguyen
(74) *Attorney, Agent, or Firm* — Pequignot + Myers; Matthew A. Pequignot

(57) ABSTRACT

A controller for a tiltable MEMS reflector is configured to oscillate the reflector about X axis or about X and Y axes, and to obtain information about current and past tilt angles. The controller is configured to evaluate tilt angles of the tiltable MEMS reflector at a later moment of time based on the previously obtained information about the tilt angles of the tiltable MEMS reflector at the different earlier moments of time. The controller may be further configured to energize the light source providing a light beam to the tiltable MEMS reflector at the later moment of time with brightness and color corresponding to the brightness and color of a pixel that will be painted by the tiltable MEMS reflector at the later moment of time. A statistical model may be combined with machine learning to accurately predict future tilt angles of the tiltable MEMS reflector.

15 Claims, 10 Drawing Sheets

(51) Int. Cl.
  *G02B 26/08* (2006.01)
  *G02B 26/10* (2006.01)
  *G06N 3/08* (2006.01)
  *G06N 7/00* (2006.01)
  *G06N 20/00* (2019.01)

(52) U.S. Cl.
  CPC ............... *G06N 3/08* (2013.01); *G06N 7/005* (2013.01); *G06N 20/00* (2019.01); *H04N 9/3155* (2013.01); *H04N 9/3191* (2013.01)

(58) Field of Classification Search
  CPC .. G06N 7/005; G02B 26/0841; G02B 26/101; G02B 26/121; G02B 26/085; G02B 27/009
  USPC ......................................................... 345/7, 8
  See application file for complete search history.

(56) References Cited

U.S. PATENT DOCUMENTS

| | | |
|---|---|---|
| 2008/0001850 A1 | 1/2008 | Champion et al. |
| 2012/0169752 A1 | 7/2012 | Kurozuka |
| 2012/0307211 A1 | 12/2012 | Hofmann et al. |
| 2018/0231767 A1* | 8/2018 | Kimura .................. G02B 26/10 |
| 2020/0149880 A1* | 5/2020 | Nishiki .............. G01B 11/2518 |

OTHER PUBLICATIONS

PCT/US2020/024273 Search Report dated Jun. 19, 2020.

* cited by examiner

TRAJECTORY ESTIMATION FOR A MEMS REFLECTOR

REFERENCE TO RELATED APPLICATION

The present application claims priority from US Provisional application No. 62/826,368, filed on Mar. 29, 2019 and incorporated herein by reference in its entirety.

TECHNICAL FIELD

The present disclosure relates to wearable headsets, and in particular to components and modules for a wearable display or a near-eye display.

BACKGROUND

Head-mounted displays (HMDs), near-eye displays (NEDs), and other wearable display systems can be used to present virtual scenery to a user, or to augment real scenery with dynamic information, data, or virtual objects. The virtual reality (VR) or augmented reality (AR) scenery can be three-dimensional (3D) to enhance the experience and to match virtual objects to real objects observed by the user. Eye position and gaze direction, and/or orientation of the user may be tracked in real time, and the displayed scenery may be dynamically adjusted depending on the user's head orientation and gaze direction, to provide a better experience of immersion into a simulated or augmented environment.

Scanning projector displays provide an image in angular domain. The angular domain image can be observed by an eye directly, without an intermediate screen or a display panel. The absence of a screen or a display panel in a scanning projector display may allow a significant weight and size reduction. A scanning projector display normally requires a compact, bright, and energy-efficient light source and a scanner capable of controllably steering a light beam generated by the light source over the field of view of the display.

SUMMARY

In accordance with the present disclosure, there is provided a controller for MEMS reflector. The controller is configured for oscillating the MEMS reflector about at least one axis, e.g. X axis, by providing driving signals to the MEMS reflector. For embodiments where the MEMS reflector is a biresonant reflector tiltable about X and Y axes, the controller may be configured for oscillating the biresonant MEMS reflector about the X and Y axes by providing driving signals to the biresonant MEMS reflector, obtaining information about tilt angles of the biresonant MEMS reflector at different moments of time, and evaluating a tilt angle of the biresonant MEMS reflector based on the obtained information about the tilt angles of the biresonant MEMS reflector at the different earlier moments of time. In other words, the controller is configured to evaluate a future tilt angle of the MEMS reflector based on the obtained information about the tilt angles of the biresonant MEMS reflector at the different earlier moments of time.

In some embodiments, the controller is configured for obtaining the information about the tilt angles of the biresonant MEMS at the different earlier moments of time by obtaining sync signals at the different earlier moments of time. The sync signals indicate a pre-determined tilt angle of the biresonant MEMS reflector at the different earlier moments of time. The information about the tilt angles of the biresonant MEMS reflector at the different earlier moments of time may be obtained e.g. by determining a phase of a resonant oscillation of the biresonant MEMS reflector at the different earlier moments of time, and/or by measuring tilt angles of the biresonant MEMS reflector about at least one of the X axis or the Y axis at the different earlier moments of time. The tilt angle of the biresonant MEMS reflector may be evaluated based on a time difference between the earlier moments of time when the biresonant MEMS reflector had a pre-determined tilt angle value.

In some embodiments, the controller is configured for determining a parameter of a model defining tilting of the biresonant MEMS reflector as a function of time based on the obtained information about the tilt angles of the biresonant MEMS reflector at the different earlier moments of time. The model may include a statistical model defining a probability distribution of the tilt angle of the biresonant MEMS reflector as a function of the tilt angles of the biresonant MEMS reflector at the different earlier moments of time. The controller may include a neural network configured to analyze the obtained information about the tilt angles of the biresonant MEMS reflector at the different earlier moments of time to determine the probability distribution of the statistical model.

In accordance with the present disclosure, there is provided a scanning projector display comprising a light source for providing a light beam, a biresonant MEMS reflector optically coupled to the light source for scanning the light beam to provide an image in angular domain, and a controller operably coupled to the light source and the biresonant MEMS reflector. The controller may be configured for oscillating the biresonant MEMS reflector about X and Y axes by providing driving signals to the biresonant MEMS reflector, obtaining information about tilt angles of the biresonant MEMS reflector at different moments of time, determining which pixel of the image corresponds to a tilt angle of the biresonant MEMS reflector based on the information about the tilt angles of the biresonant MEMS reflector at the different earlier moments of time, and operating the light source at a power level corresponding to brightness of the pixel.

In some embodiments of the scanning projector display, the biresonant MEMS reflector comprises a feedback circuit coupled to the controller and configured to provide sync signals thereto when a tilt angle of the biresonant MEMS reflector reaches a pre-determined value. The controller may be further configured for determining a parameter of a model defining tilting of the biresonant MEMS reflector as a function of time based on the obtained information about the tilt angles of the biresonant MEMS reflector at the different earlier moments of time.

In accordance with the present disclosure, there is further provided a method for controlling a MEMS reflector. The method includes oscillating the MEMS reflector about at least one axis by providing driving signals to the MEMS reflector, obtaining information about tilt angles of the MEMS reflector at different moments of time, and evaluating a tilt angle of the MEMS reflector based on the obtained information about the tilt angles of the MEMS reflector at the different earlier moments of time. Obtaining the information about the tilt angles of the MEMS reflector for evaluating the tilt angle of the MEMS reflector may include obtaining sync signals at the different earlier moments of time, the sync signals indicating a pre-determined tilt angle of the MEMS reflector at the different earlier moments of time.

In certain embodiments, e.g. where the MEMS reflector is a biresonant MEMS reflector tiltable about X and Y axes, the controller may be configured for oscillating the biresonant MEMS reflector about X and Y axes by providing driving signals to the biresonant MEMS reflector. For such and other embodiments, the method may further include determining a parameter of a model defining tilting of the MEMS reflector as a function of time based on the obtained information about the tilt angles of the MEMS reflector at the different earlier moments of time.

The model defining tilting of the biresonant MEMS reflector may include a statistical model defining a probability distribution of the tilt angle of the biresonant MEMS reflector as a function of the tilt angles of the biresonant MEMS reflector at the different earlier moments of time. For this embodiment, the method may further include using a neural network to analyze the obtained information about the tilt angles of the biresonant MEMS reflector at the different earlier moments of time to determine the probability distribution of the statistical model. To that end, the neural network may be configured to determine the probability distribution of the statistical model based on measurements of tilt angles of the biresonant MEMS reflector about X and Y axes performed in a test setup.

The model defining tilting of the biresonant MEMS reflector as a function of time may include a parametric analytical model defining the tilt angle of the biresonant MEMS reflector at a later moment of time as a function of the tilt angles of the biresonant MEMS reflector at the different earlier moments of time. The parametric analytical model may include a model defining cross-coupling between oscillations of the biresonant MEMS reflector about X and Y axes. The method may also include using a neural network to analyze the obtained information about the tilt angles of the biresonant MEMS reflector at the different earlier moments of time to determine a parameter of the model defining cross-coupling between oscillations of the biresonant MEMS reflector about X and Y axes.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1:
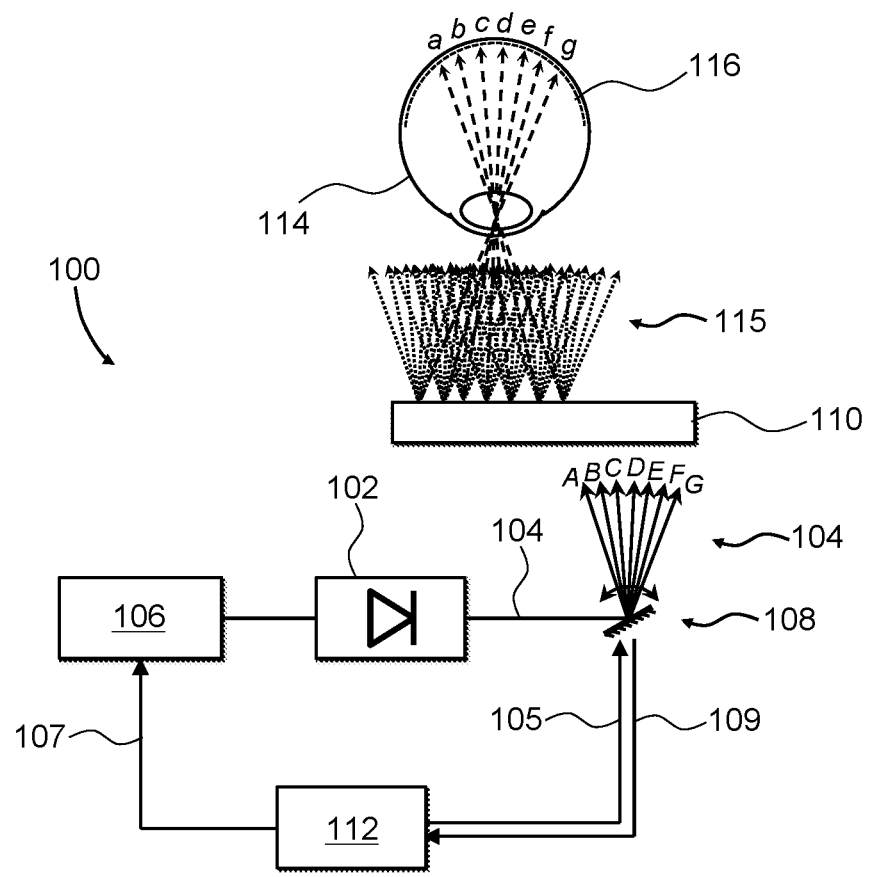
FIG. 1 is a schematic view of a projection display illustrating its principle of operation.
Figure 6A:
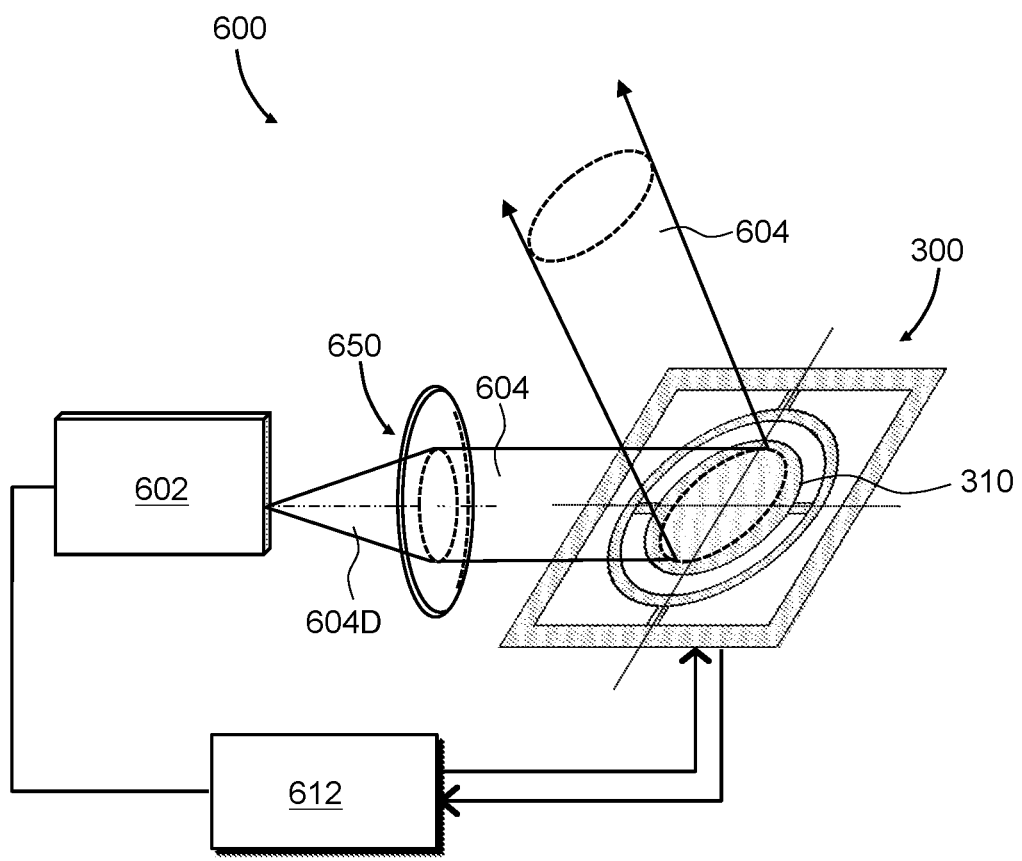
FIG. 6A is a schematic view of a scanning projector display including the 2D MEMS reflector of FIG. 3 and a superluminescent LED (SLED) array as a light source.
Figure 6B:
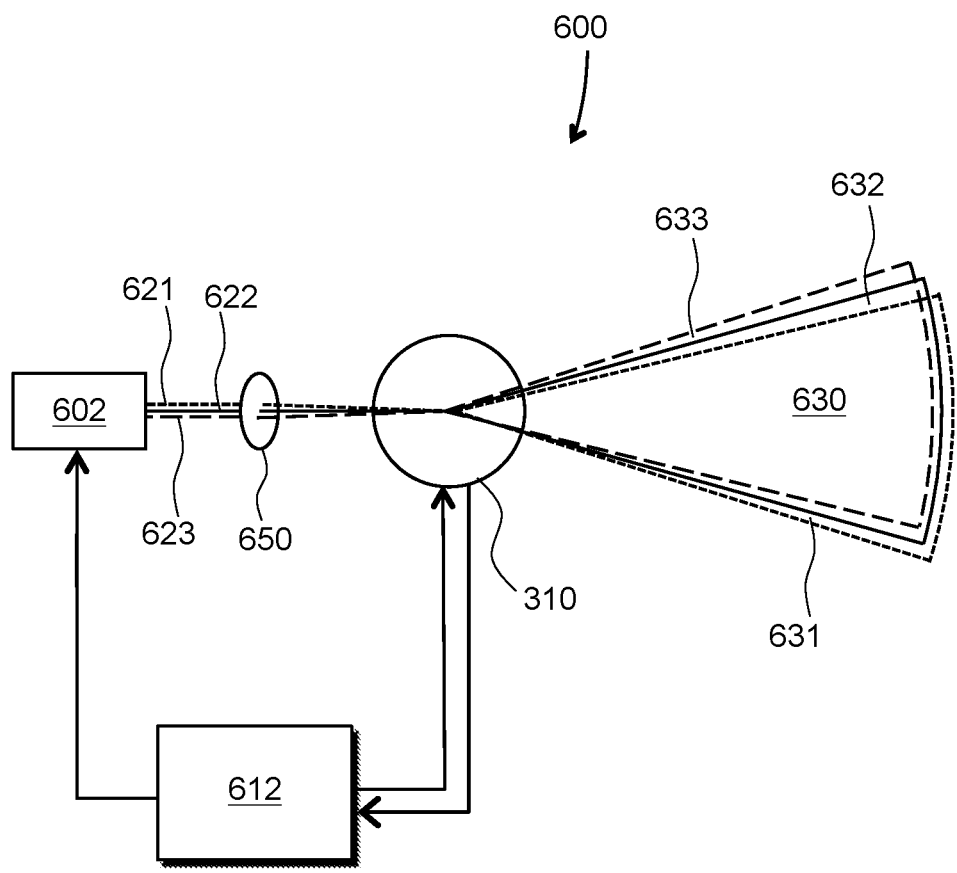
FIG. 6B is a schematic top view of the scanning projector display of FIG. 6A illustrating a relationship between fields of view provided by individual emitters of the SLED array.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1, 6A, and 6B, similar reference numerals denote similar elements.

A tiltable MEMS reflector may be used to provide fast scanning of an optical beam about one axis, e.g. X-axis, or two axes, e.g. X- and Y-axes, which may or may not be perpendicular to one another. A biresonant MEMS reflector may be used to provide fast 2D scanning of an optical beam in a scanning projector display by fast resonant oscillations of the MEMS reflector about X- and Y-axes. Herein, the term "biresonant" means that the MEMS reflector is operated at or near a resonance of both X- and Y-oscillations. The biresonant operation may allow one to reduce power consumption while having high refresh rates and high resolution of the scanning projector display.

The biresonant operation, however, is not without challenges of its own. For instance, an instantaneous angle of tilt of a biresonant MEMS reflector may be difficult to predict deterministically due to a number of technical reasons, including thermal drifts of the resonance frequencies and vibrational coupling between oscillations along the different axes.

In accordance with the present disclosure, a tiltable MEMS reflector is allowed to oscillate about each axis at a corresponding resonant frequency. For a single-axis tiltable MEMS, the reflector may oscillate at a single resonant frequency about a single axis. A biresonant MEMS reflector is allowed to resonantly oscillate about two axes, i.e. in 2D, making a trajectory resembling pseudo-random Lissajous figures in X- and Y-tilt angular space. The display's field of view is "painted" by setting a brightness of a solid state light source, such as a light-emitting diode or another suitable light source, in accordance with the current 2D angle of tilt of the MEMS reflector. Feedback and/or sync signals may be used to determine current and/or future 2D reflector orientation with a sufficient precision. A physical/parametric/statistical model and/or a learning algorithm may then be utilized to determine the future reflector angles from the present and past angles, i.e. to accurately determine the frequency, phase and/or amplitude of the MEMS biresonant oscillation.

In general, the certainty of the MEM reflector angular trajectory prediction will be more accurate in a near future and less accurate in a more distant future. This may be remedied by continuously updating the prediction to retain high accuracy. The predicted reflector angles may be used to compensate for a time lag between the actual reflector angle determination and setting the brightness of the light source at a specific MEMS angular position. The time lag may originate from a delay of sync signals, a processing time for a controller to look up which pixel of the image to be displayed the determined reflector angle corresponds, find the color and/or brightness value at that pixel for that frame and then send that information to the light source to properly adjust the brightness and/or color of the generated light beam.

Normally, when the MEMS trajectory is deterministic, the time lag is not a problem, as the controller may be configured to prepare the brightness/color values in advance. In case of a biresonant MEMS reflector, however, the tilt angle trajectory is can be affected by multiple factors, and hence requires extrapolation of the MEMS angular position in the future in the presence of such time lags. The trajectory prediction scheme applies to various operating modes of the biresonant MEMS reflector, including without limitation fixed frequency drive, fixed frequency ratio between the two axes, active frequency stabilization to the respective resonance position, and any combination of the aforementioned.

Referring to FIG. 1, a scanning projector display 100 includes a solid-state light source 102. The solid-state light source 102 may include a single-mode or multimode light source such as a light-emitting diode (LED) including a superluminescent light-emitting diode (SLED), a side-emitting laser diode, a vertical-cavity surface-emitting laser diode (VCSEL), etc. In operation, the solid-state light source 102 provides a light beam 104 when powered by a driver 106 operably coupled to the light source 102.

A scanner 108, e.g. a microelectromechanical system including a tiltable (MEMS) reflector, is optically coupled to the solid-state light source 102 for scanning the light beam 104 in one or two dimensions, e.g. about an X-axis and/or Y-axis perpendicular to the X-axis. The X- and Y-axes are in plane of the MEMS reflector at its normal i.e. unpowered position. Pre-tilt of the MEMS reflector may also be used. A pupil replicator 110 provides a light field 115 including multiple laterally displaced parallel copies of the scanned light beam 104.

A controller 112 may be operably coupled to the scanner 108 and the driver 106. The controller 112 may be configured for providing driving signals 105 to the biresonant MEMS reflector and providing control signals 107 to the driver 106 for powering the light source 102 in coordination with scanning the scanner 108. For example, the controller 112 may cause the scanner 108 to scan the light beam 104 through a succession of directions "A" through "G", while causing the driver 106 to change the brightness of the solid-state light source 102 in accordance with an image being displayed, thus forming an image in angular domain. A feedback circuit may be provided to provide information about the current MEMS reflector angular position by means of feedback signals 109 to the controller 112. The feedback signals 109 may include, for example, temporal sampling of the X and Y MEMS angular position, or sync signals at specific pre-determined MEMS reflector tilt angles.

The pupil replicator 110 provides multiple laterally displaced parallel copies of the scanned light beam 104 in directions "A" through "G", as illustrated. A viewer's eye 114 receives the light field 115, and forms an image at the eye's retina 116 from the corresponding replicated light beams at various angles. A linear position of the beam copies on the eye's retina 116 is denoted with letters "a" through "g", and corresponds to the directions "A" through "G" of the scanned light beam 104. In this manner, the eye 114 forms a linear image on the eye's retina 116 from the image in the angular domain formed by the light field 115.

Figure 2:
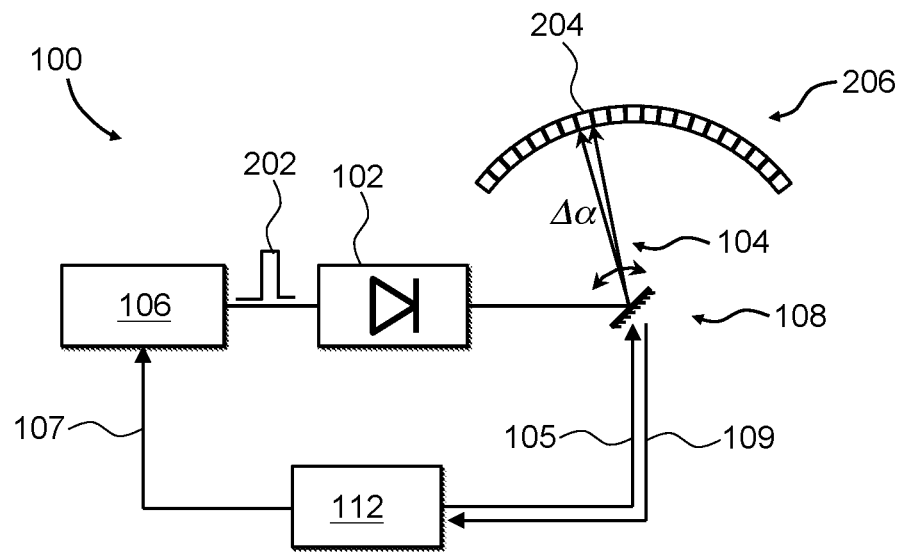
FIG. 2 is a schematic view of the projection display of FIG. 1 scanning across pixels of an image in angular domain.

Turning to FIG. 2, the controller 112 may be configured for operating the driver 106 for providing powering pulses 202 to the solid-state light source 102. A pulsewidth of the powering pulses 202 is equal to or less than a time interval during which the scanner 108 of the projector display 100 is directing the light beam 104 through an angular range Δα corresponding to a current pixel 204 of the image being displayed. This time interval is termed herein a pixel time interval. The pulse can be of any shape, as long as its duration is below the pixel time interval. Pixels 206, including the currently displayed pixel 204, are shown in FIG. 2 in an arc configuration, to illustrate that the image being generated is in angular domain. In angular domain, each beam angle corresponds to a pixel of the image to be displayed to the user. The energy of the powering pulses 202 may be selected in accordance with the current pixel 204 (or more than one pixel for multi-emitter light sources powered by their own powering pulses) being displayed at any given moment of time.

Figure 3:
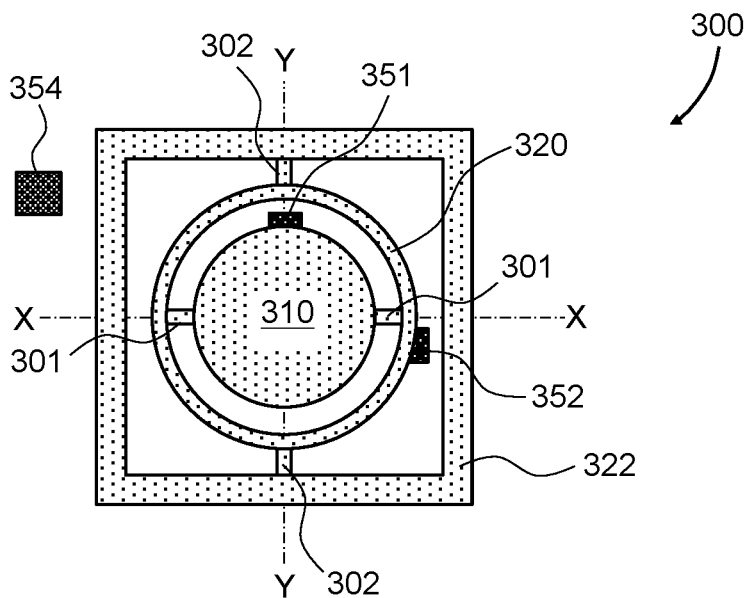
FIG. 3 is a plan view of a 2D scanning microelectromechanical system (MEMS) reflector.

Referring to FIG. 3, a two-dimensional (2D) MEMS scanner 300 includes a tiltable reflector 310, e.g. a mirror, supported by a pair of first torsional hinges 301 allowing tilting the tiltable reflector 310 about X axis. The first torsional hinges 301 extend from the tiltable reflector 310 to a gimbal ring 320, which is supported by a pair of second torsional hinges 302 extending from the gimbal ring 320 to a fixed base 322, for tilting the gimbal ring 320 and the tiltable reflector 310 as a whole about Y axis. Actuators may be disposed underneath the tiltable reflector 310 and/or the gimbal ring 320 for providing a force for actuating the tilt of the tiltable reflector 310 about X and Y axes. The actuators may be electrostatic, electro-magnetic, piezo-electric, etc. For electrostatic mirror actuation, a comb drive may be located on the torsional hinge members. For example, in the embodiment shown in FIG. 3, a first actuator 351 may be disposed under an edge of the reflector 310 to tilt the tiltable reflector 310 about X-axis. A second actuator 352 may be disposed under the gimbal ring 320 for tilting the gimbal ring 320 with the tiltable reflector 310 about Y-axis. A single-axis MEMS scanner may be constructed similarly, but with only one pair of torsional hinges, e.g. the first torsional hinges 301.

A feedback circuit 354 may be provided for providing feedback information about the X- and/or Y-angles of tilt of the tiltable reflector 310. The feedback circuit 354 may measure electric capacitance between the first electrostatic actuator 351 and the tiltable reflector 310 to determine the X-tilt, and electric capacitance between the second electrostatic actuator 352 and the gimbal ring 320 to determine the Y-tilt. Separate electrodes may also be provided specifically for the feedback circuit 354. The feedback may also be magnetic, e.g. the feedback may be based on a small magnet disposed on the tiltable reflector 310 and a Hall-effect sensor disposed on the substrate underneath the magnet. In some embodiments, the feedback circuit 354 may provide sync or triggering pulses when the tiltable reflector 310 is tilted at a certain pre-determined X- and/or Y-tilt angle, including zero tilt angle.

The sync signals may be generated at specific angles of tilt of the tiltable reflector 310, e.g. when crossing a zero tilt angle. Full temporal trajectories of the X- and Y-tilt angles may be provided in some embodiments. The capacitance may be measured via voltage measurements, and/or via a radio-frequency (RF) reflection from portion(s) of the tiltable reflector 310 and a phase detector using, for example, a frequency mixer and low-pass filter. In some embodiments, a small magnet may be placed on the tiltable reflector 310, and a nearby pickup coil e.g. fixed to the base 322 may be used to pick oscillations of the tiltable reflector 310. Furthermore in some embodiments, an optical signal may be reflected from the tiltable reflector 310 and a photodetector may be used to detect the reflected beam. The photodetector may or may not have spatial resolution. For spatial resolution detectors, a detector array or a quadrant detector may be used.

It is noted that the 2D MEMS scanner 300 is only an example of a scanner implementation. Many other implementations are possible. By way of a non-limiting example, various comb structures may be used to provide an increased electrostatic attraction force between electrodes. Comb and/or honeycomb structures may be used to stiffen the tiltable reflector 310. The tiltable reflector 310 may include a mirror surface, a multilayer dielectric reflector, etc. The tiltable reflector 310 may be located at the center of the 2D MEMS scanner 300, or may be offset from the center if required. Furthermore, a 2D MEMS scanner may be replaced with a pair of 1D MEMS scanners optically coupled via a pupil relay. The teachings of the present disclosure are applicable to the 1D MEMS scanner(s), as well. For 1D MEMS scanner(s), the construction and control of the tiltable MEMS reflector may be simplified. In a pair of 1D MEMS scanners coupled via a pupil relay and oscillating about non-parallel axes, the oscillations are decoupled from one another, which simplifies the overall trajectory prediction.

Figure 4:
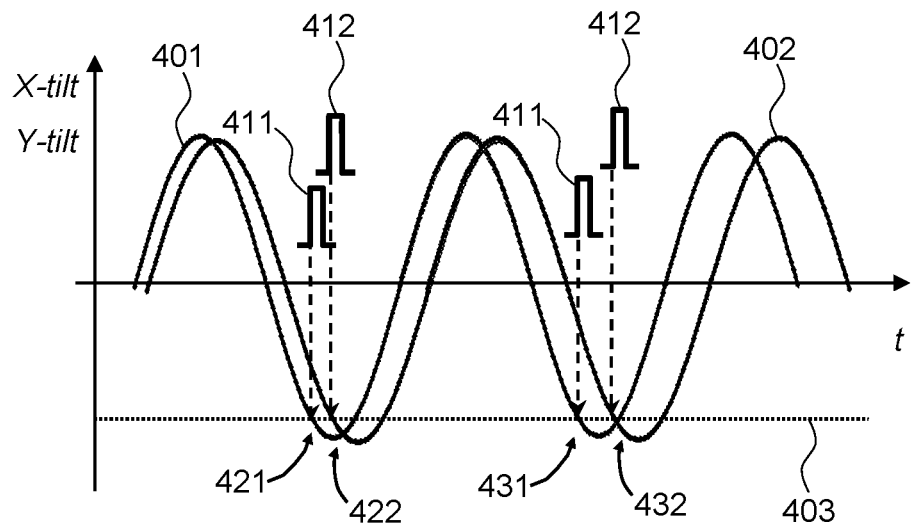
FIG. 4 is a graph of X- and Y-tilt angle of the 2D MEMS reflector of FIG. 3 vs. time.

Referring to FIG. 4, the X- and Y-angles of tilt of the tiltable reflector 310 of the 2D MEMS scanner 300 are plotted as a function of time. In biresonant mode, the tiltable reflector 310 is driven to oscillate about both X- and Y-axes at frequencies near their mechanical resonances, providing fast and energy-efficient scanning of the light beam 104 across a wide scanning range. When near resonance, X-tilt 401 and Y-tilt 402 of the tiltable reflector 310 show a nearly-sinusoidal time dependence. However, the phase of the near-sinusoidal oscillations may vary randomly, e.g. due to a dependence of X-axis resonance frequency on Y-axis tilt value, and/or vice versa, which causes coupling between X- and Y-oscillations. Furthermore, the resonant frequencies of the X- and Y-oscillations may drift with time and temperature.

The phases, frequencies and/or amplitudes of the X- and Y-oscillations may be determined by providing respective sync pulses 411, 412, which may be generated by the feedback circuit 354 when the corresponding X- and/or Y-tilt angles reach a pre-determined threshold value 403. The threshold values may be different for X- and Y-tilt angles. Multiple thresholds are also possible in some implementations. The direction of the oscillation may also be accounted for. For instance, the sync pulses 411 and 412 may only be generated when the X- and Y-tilt angles increase with time when reaching the threshold value 403. For X-tilt 401, the angle reaches the threshold value 403 at a first moment of time 421 and then at a second moment of time 431. For Y-tilt 402, the angle reaches the threshold value 403 at a first moment of time 422 and then at a second moment of time 432.

Other sync configurations are possible, in which the reflector tilt angle is a maximum angle, a zero angle, etc. It is noted that zero-crossing signals offer the advantage of being less susceptible to electronics drift. As explained above, the feedback may be capacitive, optical, etc. It is further noted that an alternative to discrete sync signals is the utilization of the full temporal signal of the MEMS position in conjunction with denoising and frequency filtering electronics. Depending on the specific implementation and requirements, this may improve the accuracy of the angular position determination of the tiltable reflector 310.

Figure 5:
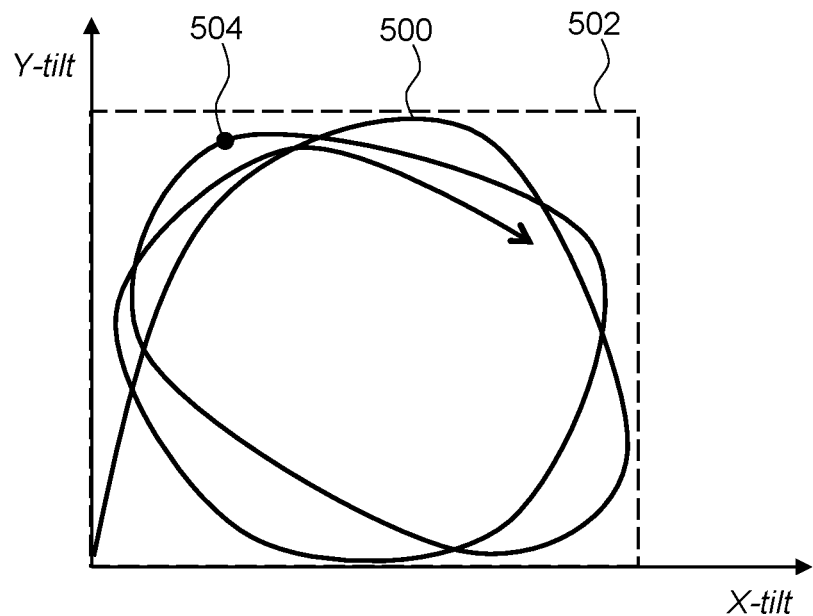
FIG. 5 is a corresponding plot of Y-tilt vs. X-tilt angle of the 2D MEMS reflector of FIG. 3.

Turning to FIG. 5, Y-tilt of the tiltable reflector 310 is plotted vs. X-tilt. Since X- and Y-tilts of the tiltable reflector 310 define an effective field of view 502 the scanning projector display 100, a point on the Y-tilt vs. X-tilt corresponds to a pixel (that is, an element of an image) displayed by the scanning projector display 100. Accordingly, a trajectory 500 needs to cover the entire field of view 502. Due to the floating frequencies/phases of X- and Y-oscillations of the tiltable reflector 310, the trajectory 500 may have multiple turns and twists, and is generally different from a traditional symmetric Lissajous curve, in that the phases of the X- and Y-oscillations are randomly or pseudo-randomly varying. Eventually, the trajectory 500 is going to cover each pixel of the image to be displayed, i.e. the entire field of view 502. The entire field of view 502 needs to be covered fast enough for the eye 114 (FIG. 1) to integrate the received light energy in the entire field of view 502 (FIG. 5), to avoid a perceived flickering of the displayed image.

Referring now to FIG. 6A with further reference to FIGS. 1 to 5, a scanning projector display 600 includes a multi-emitter light source 602 e.g. a SLED array, providing a diverging optical beam 604D. A collimator 650 is optically coupled to the multi-emitter light source 602, and the 2D MEMS scanner 300 of FIG. 3 optically coupled to the collimator 650. The controller 612 can be operably coupled to the multi-emitter light source 602 and the 2D MEMS scanner 300.

The collimator 650 may include a lens, a folded-path optical element having focusing power, a concave reflector, a diffractive lens, etc. The collimator 650 is optically coupled to the multi-emitter light source 602 for collimating the diverging optical beam 604D to obtain a collimated optical beam 604. The tiltable reflector 310 of the 2D MEMS scanner 300 is optically coupled to the collimator 650 for receiving and scanning the collimated optical beam 604.

The controller 612 may be configured to provide control signals to the multi-emitter light source 602 in coordination with operating the 2D MEMS scanner 300 to provide an image in angular domain. When viewed by the human eye 114 (FIG. 1), the image in angular domain is projected by the eye's cornea and lens to become a spatial-domain image on the eye's retina 116 (FIG. 1). The controller 612 (FIG. 6A) may evaluate the current tilt angle of the tiltable reflector 310 from obtained information about past tilt angles of the tiltable reflector 310, e.g. from the moments of time the sync pulses 411, 412 arrive at the controller 612, or from a time difference between the sync pulses 411, 412. In some implementations, the controller 612 may use phase-lock circuits fed by the sync pulses 411, 412 to determine the current X- and Y-tilt angles of the tiltable reflector 310.

Once the current orientation of the tiltable reflector 310 is determined e.g. at a location 504 shown in FIG. 5, the controller 612 (FIG. 6) may look up the image e.g. a current frame of a video feed to be displayed, to determine which pixel or pixels correspond to the current X- and Y-tilt angles of the tiltable reflector 310, and to determine the brightness and/or color value of those pixels. Several pixels may be looked up because the multi-emitter light source 602 includes a plurality of individually energizable emitters, each "painting" its own pixel. The controller 612 may then provide a control signal to operate the multi-emitter light source at power levels corresponding to the required brightness and color of the pixel(s) being painted.

In some embodiments, the controller 612 may analyze statistical patterns of oscillations of the tiltable reflector 310 and derive an estimate of an orientation of the tiltable reflector 310 in the near future based on past behavior of the tiltable reflector 310 in the 2D MEMS scanner 300. This may be required when a time lag exists between receiving the sync pulses 411, 412 and determining the current reflector orientation, and/or between determining the required pixel brightness/color and generating a corresponding light beam by the multi-emitter light source 602. The prediction of the tilt trajectory of the tiltable reflector 310, e.g. the trajectory 500 of FIG. 5, may compensate for those time lags and provide good image synchronization.

The operation of the scanning projector display 600 is further illustrated in FIG. 6B. In this example, the multi-emitter light source 602 includes three emitters providing three light beams (only chief rays shown) 621 (dotted lines), 622 (solid lines), and 623 (dashed lines). The collimator 650 collimates the beams 621, 622, and 623. By selecting suitable geometry e.g. distances and focal length of the collimator 650, the latter may also cause the beams 621, 622, and 623 to impinge onto a center of the reflector 510 at slightly different angles of incidence, for scanning all three beams 621, 622, and 623 together. Since the angles of incidence of the beams 621, 622, and 623 onto the tiltable reflector 310 are different, respective scanning areas 631 (dotted lines), 632 (solid lines), and 633 (dashed lines) of the beams 621, 622, and 623, respectively, are mutually offset as shown. The controller 612 may take these spatial offsets into account by providing corresponding delays to the driving signals of the three emitters of the multi-emitter light source 602. Spatial offsets, in combination with the delays in energizing individual emitters, may be provided such as to effectively triple the spatial resolution of the projector display 600 in a common scan area 630, as compared to a case of a single emitter. Spatial offsets may also provide a higher rate for a given oscillation frequency of the reflector 310 of pixel painting in the scan area by painting multiple pixels simultaneously.

Figure 7:
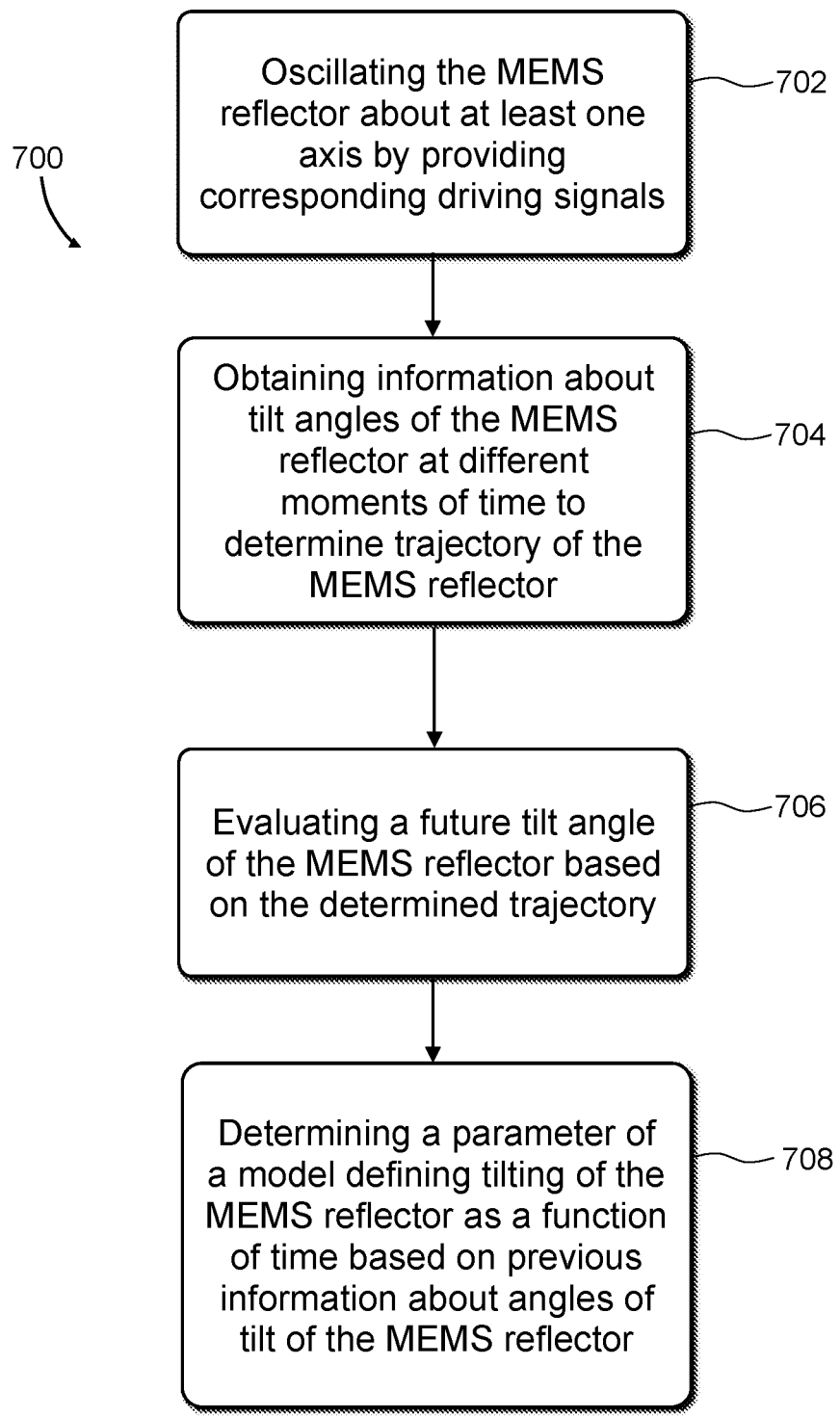
FIG. 7 is a flow chart of a method for displaying an image.

Referring to FIG. 7 with further reference to FIGS. 1 to 6, a method 700 (FIG. 7) may be used for controlling a tiltable reflector, including the scanner 108 of FIGS. 1 and 2 and the tiltable reflector 310 of the 2D MEMS scanner 300 of FIGS. 3, 6A, and 6B. The method 700 includes oscillating (702) the MEMS reflector about one or more axes by providing driving signals to the MEMS reflector. For example, the method 700 can provide driving signals to oscillate a biresonant MEMS reflector about X and Y axes. Information is obtained (704) about tilt angles of the MEMS reflector at different moments of time to determine trajectory (i.e. tilt angles vs. time) of the MEMS reflector. Then, a future tilt angle of the MEMS reflector is evaluated (706), i.e. predicted with a certain degree of accuracy, based on the previously determined trajectory. Herein, the term "future tilt angle" means a tilt angle at a later moment of time relative to the different previous moments of time when the information about the tilt angles of the MEMS reflector was obtained.

In some embodiments of the method 700, obtaining information about past trajectory of the MEMS reflector includes obtaining a sync signal, e.g. the sync pulses 411, 412 of FIG. 4, at different earlier moments of time, indicating a pre-determined tilt angle of the MEMS reflector, at the earlier moments of time (FIG. 4), e.g. the X-tilt first moment of time 421 and the second moment of time 431, and/or the Y-tilt first moment of time 422 the second moment of time 432. Then, the future tilt angle of the MEMS reflector may be evaluated (FIG. 7; 706) for X-tilt 431 and/or Y-tilt 432, based on the previously determined trajectory of the MEMS reflector. Obtaining information about the tilt angles of the MEMS reflector enables one to determine phase, resonant frequency, and/or amplitude of a resonant or biresonant oscillation (e.g. the MEMS X-tilt 401 and MEMS Y-tilt 402 in FIG. 4) of the MEMS reflector. Once the phase, frequency, and the amplitude are known, near-future angles of tilt of the MEMS reflector may be evaluated with a degree of probability, which generally decreases with time.

In biresonant MEMS embodiments of the method 700, Y-tilt information may be based not only on Y-tilt information, but also on X-tilt information, to take account of the cross-coupling between the X- and Y-oscillations of a biresonant MEMS reflector. A purely analytical model, e.g. a parametric model, may be built for this purpose, which models the cross-coupling between the two axes based on a set of input parameters. The parametric model may also be accounted for in a statistical model of the biresonant reflector behavior. The statistical model establishes a probability distribution of future X- and Y-tilt angles of a biresonant reflector based one determined past X- and Y-tilt angles. A statistical analysis/model, an analytic/parametric model for physical model, machine learning (e.g. supervised learning) with independent measurement of MEMS angles in a test setup, or any combination of aforementioned may be used to process the information about past tilt angles of the biresonant MEMS reflector at different past moments of time, i.e. past trajectory. This past trajectory information is processed to evaluate or predict future tilt angles of the biresonant MEMS reflector at different future moments of time, i.e. the future trajectory of the biresonant MEMS reflector.

Still referring to FIG. 7, the method 700 may further include determining (708) the in-situ time evolution of one or several model parameters, which may improve the subsequent evaluation of the MEMS tilt angle. Such parameters may be, for example, material stress or shear, temperature, air pressure at the MEMS, etc. A high accuracy value for the current MEMS frequency/phase/amplitude may then be obtained by combining this information with previous information about angles of tilt of the biresonant MEMS reflector at previous moments of time. Such system parameters may also be used as input for an analytic or statistical model for the cross-coupling between the two axes.

Figure 8:
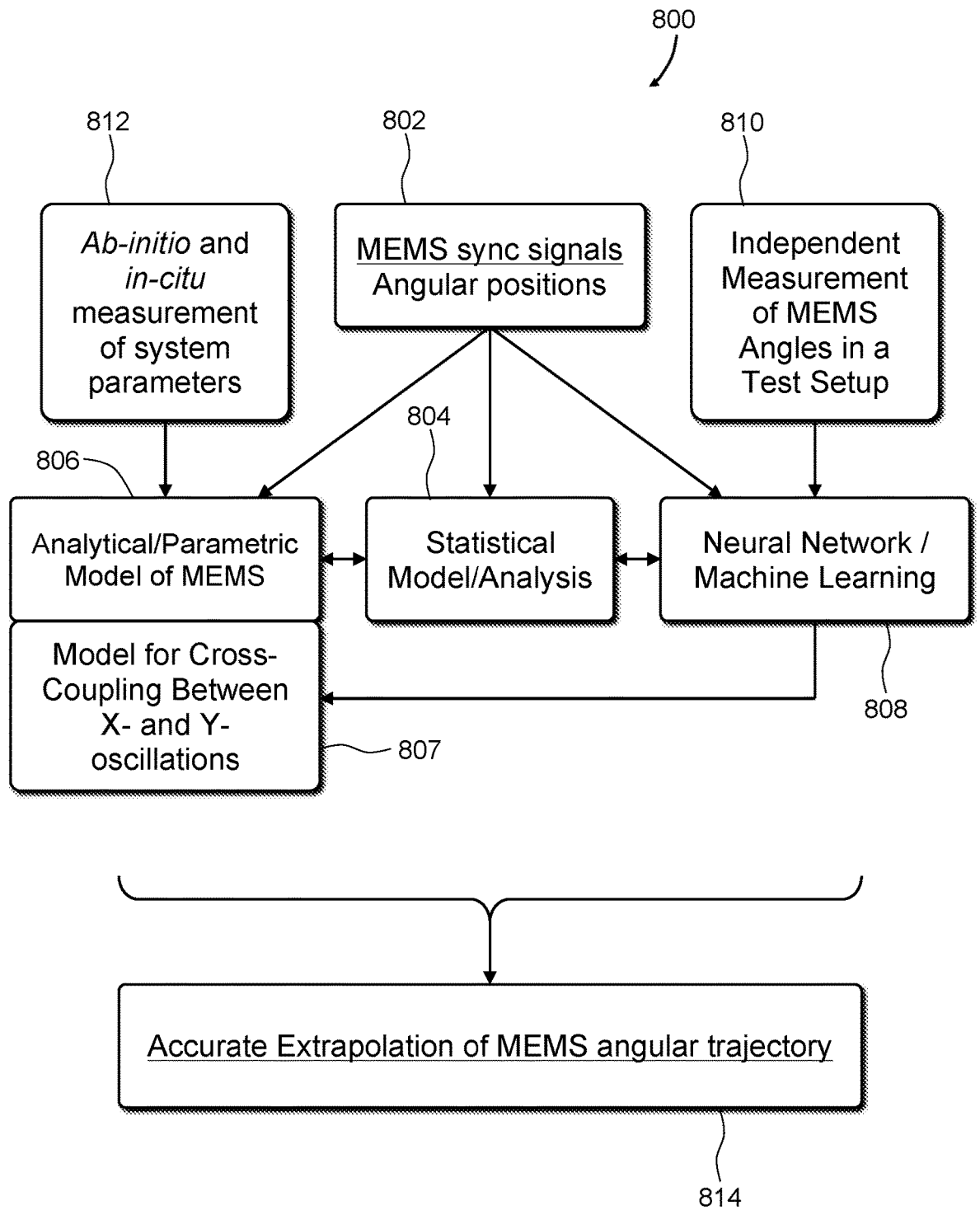
FIG. 8 is a flow chart of a method for extrapolating an angular trajectory of a biresonant MEMS reflector, illustrating a relationship between various models for predicting future tilt angles of the 2D MEMS reflector of FIG. 3.

Interoperability of different models for the purpose of predicting future tilt angles of a biresonant MEMS reflector is illustrated in FIG. 8. A method 800 for extrapolating an angular trajectory of a biresonant MEMS reflector includes receiving (802) MEMS sync signals, or other information about tilt angles (angular positions) of the biresonant MEMS reflector. This information is fed into a statistical model 804, and/or into an analytical/parametric model 806 of the biresonant MEMS reflector. The analytical/parametric model 806 of MEMS may include a model 807 for cross-coupling between X- and Y-oscillations. The information about tilt angles of the biresonant MEMS reflector may also be fed into a neural network/machine learning module 808, which may be configured to analyze the previously obtained information about the tilt angles of the biresonant MEMS reflector at the different earlier moments of time to determine the probability distribution of the statistical model 804. In some embodiments, the tilt angles of biresonant MEMS reflector are measured independently in a test setup (810) and fed into the neural network/machine learning module 808, which may be configured to determine the probability distribution of the statistical model 804 based on the measurements of the tilt angles of the biresonant MEMS reflector about X and Y axes performed in the test setup. Furthermore, ab-initio and in-situ measurement of system parameters 812 may be fed into the analytical/parametric model of MEMS 806. All the processed information may facilitate a more accurate extrapolation of MEMS angular trajectory 814.

The statistical model 804 may accumulate statistical information about the past tilt angles of the biresonant MEMS reflector at different moments of time, and establish statistical trends of the drift of phase/amplitude/frequency of oscillations of the biresonant MEMS reflector. As indicated above, these trends may be determined at a factory calibration stage of the scanning display and/or in-field, i.e. during actual operation of the scanning projector display. The gradual accumulation of the statistical information about the reflector tilt trends may enable a gradual increase of the accuracy of prediction of the reflector tilt angles, or at least may track slowly varying reflector oscillation parameters due to aging.

Examples of the statistical model 804 include taking the mean value of the time difference between adjacent sync pulses over a specific time period in the past for an oscillation direction, which itself can be fixed or slowly variable in time as the accuracy changes. Instead of the mean value, any form of linear or nonlinear interpolation may be used. More sophisticated methods may be based on a statistical analysis of both oscillation directions X and Y. The analytical/parametric model 806 may be based on physical modeling of the MEMS reflector oscillations, based on various system parameters that may be e.g. pre-determined during production or measured in-field with separate test equipment during installation. For example, the analytical/parametric model 806 may be based on a model defining cross-coupling between oscillations of the biresonant MEMS reflector about X and Y axes.

In some embodiments, the analytical/parametric model 806 may be combined with the statistical model 804. The analytical/parametric model 806 may provide a framework of parameters which are statistically updated during operation of the biresonant MEMS scanner. Furthermore, in some embodiments, the neural network 808 may be used to determine regularities of the reflector oscillations about X- and Y-axes, e.g. to determine a parameter of the model defining cross-coupling between oscillations of the biresonant MEMS reflector about X and Y axes.

The neural network model 808 may be trained, e.g. by supervised learning, using training data obtained from an independent measurement 810 of the MEMS angular trajectory. The independent measurement 810 may be performed e.g. by shining a laser beam at the MEMS reflector and capturing the reflected laser beam together with capturing the timing of the sync signals. Once the neural network 808 has been trained and a desirable accuracy has been achieved, the sync signals can be used to extrapolate the MEMS tilt angles in the future.

The above teachings are applicable to 2D MEMS scanners and to 1D MEMS scanners, e.g. a single 1D MEMS scanner or a pair of 1D MEMS scanners optically coupled via a pupil relay. For the latter case, the methodology illustrated in FIGS. 7 and 8 is also applicable. The mechanical oscillations of optically coupled 1D tiltable MEMS reflectors are decoupled from one another, which may simplify the scanning control and learning of MEMS trajectory behavior, as compared to the case of a 2D tiltable MEMS reflector.

Figure 9:
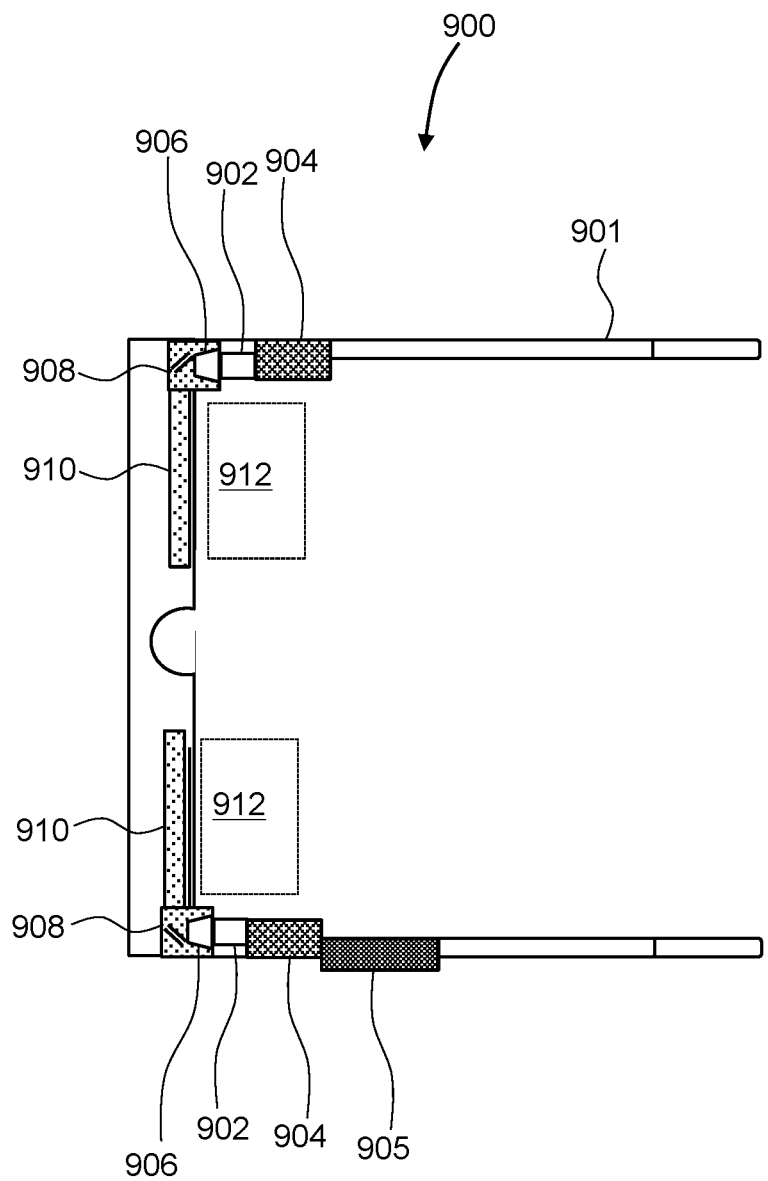
FIG. 9 is a schematic top view of a near-eye display including a scanning projector display disclosed herein.

Referring to FIG. 9, a near-eye display 900 includes a frame 901 having a form factor of a pair of glasses. The frame 901 supports, for each eye: a light source subassembly 902, an electronic driver 904 operably coupled to the light source subassembly 902 for powering the light source subassembly 902 for providing at least one light beam, a collimator 906 optically coupled to light source subassembly 902 for collimating the light beam, a scanner 908, e.g. a biresonant tiltable MEMS reflector described above, optically coupled to the collimator 906, and a pupil replicator 910 optically coupled to the scanner 908. The light source subassembly 902 may include a substrate supporting an array of single-mode or multimode semiconductor light sources, e.g. side-emitting laser diodes, vertical-cavity surface-emitting laser diodes, SLEDs, or light-emitting diodes, for providing a plurality of light beams. The collimators 906 may include a concave mirror, a bulk lens, a Fresnel lens, a holographic lens, etc., and may be integrated with the light source subassembly 902. The scanners 908 may include the 2D MEMS scanner 300 of FIG. 3, for example. The function of the pupil replicators 910 is to provide multiple laterally offset copies of the light beams redirected or scanned by the scanner 908 at eyeboxes 912, as has been explained above with reference to FIG. 1.

A controller 905 is operably coupled to the scanners 908 and the electronic drivers 904. The controller 905 may be configured for determining the X- and Y-tilt angles of the biresonant tiltable MEMS reflector. Then, the controller 905 determines which pixel or pixels of the image to be displayed correspond to the determined X- and Y-tilt angles. Then, the controller 905 determines the brightness and/or color of these pixels, and operates the electronic drivers 904 accordingly for providing powering electric pulses to the light source subassemblies 902 to produce light pulses at power level(s) corresponding to the determined pixel brightness and color. The methods 700 and 800 described above may be used to predict the near-future trajectory of the biresonant tiltable MEMS reflector and to use the time provided by this prediction to offset time delays due to tilt angle measurement processing time, look-up time to obtain brightness and color values, pulse generation time by the electronic drivers 904, etc.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 10A:
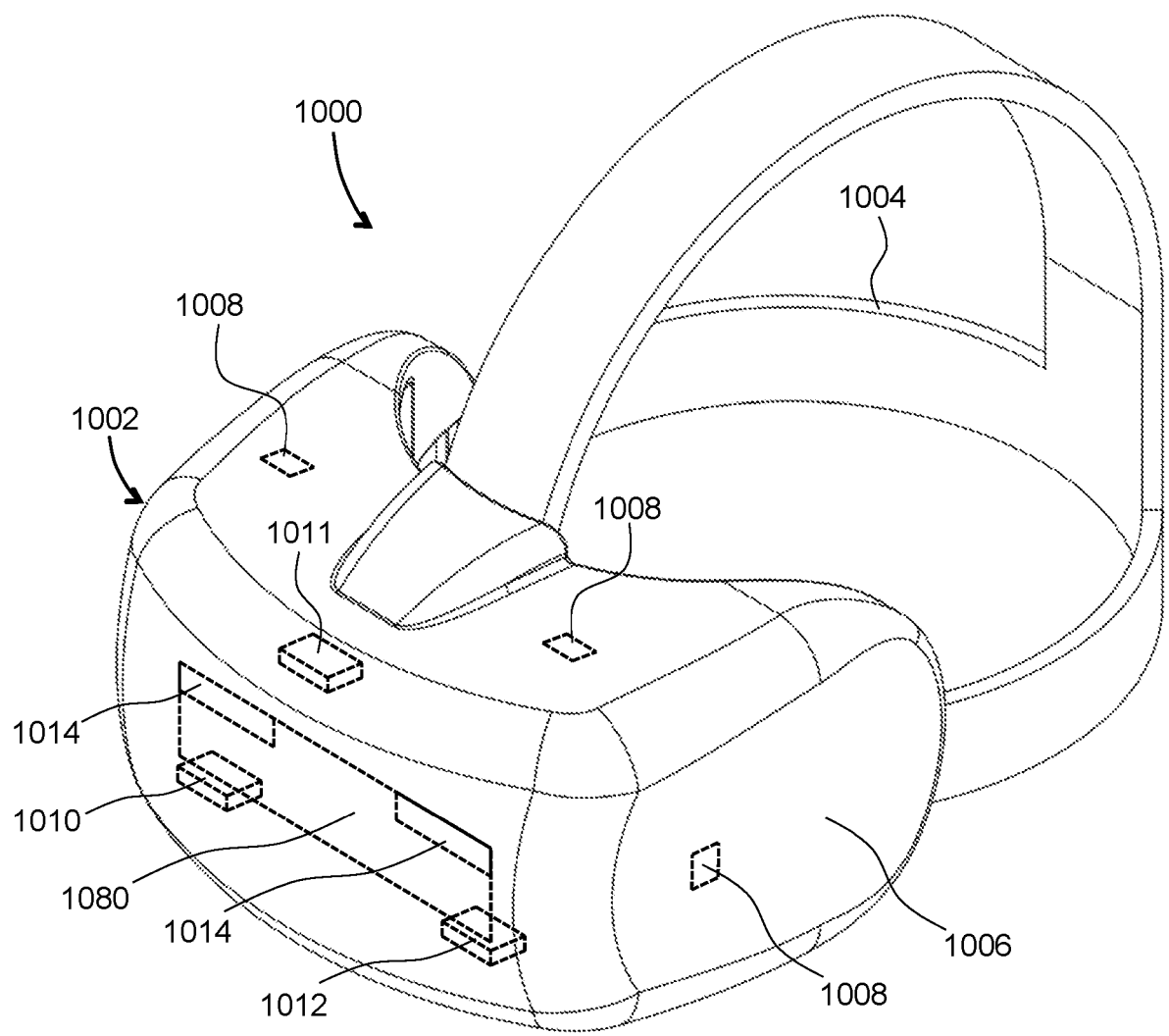
FIG. 10A is an isometric view of a head-mounted display of the present disclosure.

Referring to FIG. 10A, an HMD 1000 is an example of an AR/VR wearable display system which encloses the user's face, for a greater degree of immersion into the AR/VR environment. The function of the HMD 1000 is to augment views of a physical, real-world environment with computer-generated imagery, and/or to generate the entirely virtual 3D imagery. The HMD 1000 may include a front body 1002 and a band 1004. The front body 1002 is configured for placement in front of eyes of a user in a reliable and comfortable manner, and the band 1004 may be stretched to secure the front body 1002 on the user's head. A display system 1080 may be disposed in the front body 1002 for presenting AR/VR imagery to the user. The display system 1080 is an embodiment of the scanning projector display 100 of FIG. 1 and/or the scanning projector display 600 of FIGS. 6A and 6B, for example. Sides 1006 of the front body 1002 may be opaque or transparent.

In some embodiments, the front body 1002 includes locators 1008 and an inertial measurement unit (IMU) 1010 for tracking acceleration of the HMD 1000, and position sensors 1012 for tracking position of the HMD 1000. The IMU 1010 is an electronic device that generates data indicating a position of the HMD 1000 based on measurement signals received from one or more of position sensors 1012, which generate one or more measurement signals in response to motion of the HMD 1000. Examples of position sensors 1012 include: one or more accelerometers, one or more gyroscopes, one or more magnetometers, another suitable type of sensor that detects motion, a type of sensor used for error correction of the IMU 1010, or some combination thereof. The position sensors 1012 may be located external to the IMU 1010, internal to the IMU 1010, or some combination thereof.

The locators 1008 are traced by an external imaging device of a virtual reality system, such that the virtual reality system can track the location and orientation of the entire HMD 1000. Information generated by the IMU 1010 and the position sensors 1012 may be compared with the position and orientation obtained by tracking the locators 1008, for improved tracking accuracy of position and orientation of the HMD 1000. Accurate position and orientation is important for presenting appropriate virtual scenery to the user as the latter moves and turns in 3D space.

The HMD 1000 may further include a depth camera assembly (DCA) 1011, which captures data describing depth information of a local area surrounding some or all of the HMD 1000. To that end, the DCA 1011 may include a laser radar (LIDAR), or a similar device. The depth information may be compared with the information from the IMU 1010, for better accuracy of determination of position and orientation of the HMD 1000 in 3D space.

The HMD 1000 may further include an eye tracking system 1014 for determining orientation and position of user's eyes in real time. The obtained position and orientation of the eyes also allows the HMD 1000 to determine the gaze direction of the user and to adjust the image generated by the display system 1080 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1002.

Figure 10B:
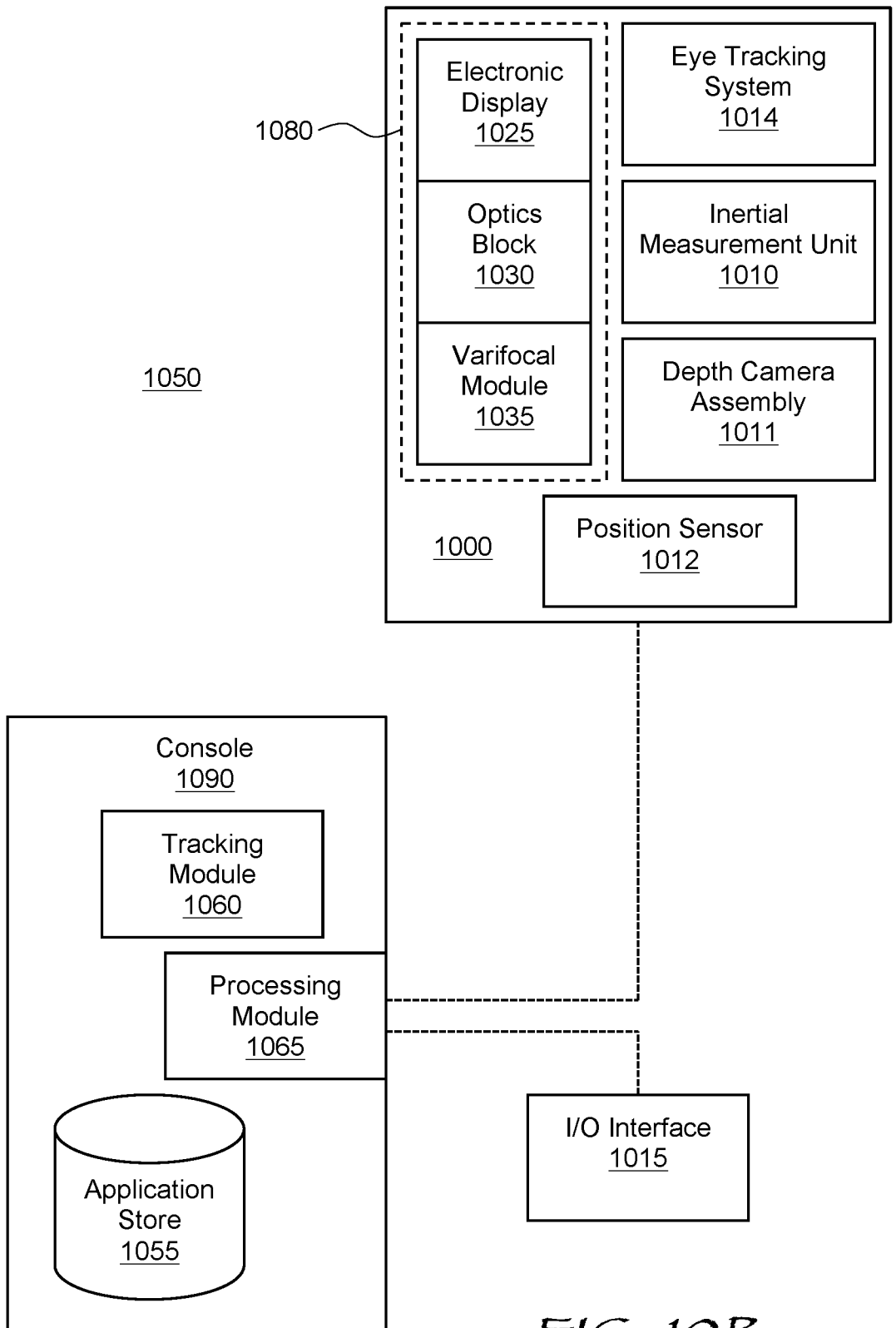
FIG. 10B is a block diagram of a virtual reality system including the headset of FIG. 10A.

Referring to FIG. 10B, an AR/VR system 1050 may include light sources and projector displays disclosed herein. The AR/VR system 1050 includes the HMD 1000 of FIG. 10A, an external console 1090 storing various AR/VR applications, setup and calibration procedures, 3D videos, etc., and an input/output (I/O) interface 1015 for operating the console 1090 and/or interacting with the AR/VR environment. The HMD 1000 may be "tethered" to the console 1090 with a physical cable, or connected to the console 1090 via a wireless communication link such as Bluetooth®, Wi-Fi, etc. There may be multiple HMDs 1000, each having an associated I/O interface 1015, with each HMD 1000 and I/O interface(s) 1015 communicating with the console 1090. In alternative configurations, different and/or additional components may be included in the AR/VR system 1050. Additionally, functionality described in conjunction with one or more of the components shown in FIGS. 10A and 10B may be distributed among the components in a different manner than described in conjunction with FIGS. 10A and 10B in some embodiments. For example, some or all of the functionality of the console 1015 may be provided by the HMD 1000, and vice versa. The HMD 1000 may be provided with a processing module capable of achieving such functionality.

As described above with reference to FIG. 10A, the HMD 1000 may include the eye tracking system 1014 (FIG. 10B) for tracking eye position and orientation, determining gaze angle and convergence angle, etc., the IMU 1010 for determining position and orientation of the HMD 1000 in 3D space, the DCA 1011 for capturing the outside environment, the position sensor 1012 for independently determining the position of the HMD 1000, and the display system 1080 for displaying AR/VR content to the user. The display system 1080 further includes an optics block 1030, whose function is to convey the images generated by the electronic display 1025 to the user's eye. The optics block may include various lenses, e.g. a refractive lens, a Fresnel lens, a diffractive lens, an active or passive Pancharatnam-Berry phase (PBP) lens, a liquid lens, a liquid crystal lens, etc., a pupil-replicating waveguide, grating structures, coatings, etc. The display system 1080 may further include a varifocal module 1035, which may be a part of the optics block 1030. The function of the varifocal module 1035 is to adjust the focus of the optics block 1030 e.g. to compensate for vergence-accommodation conflict, to correct for vision defects of a particular user, to offset aberrations of the optics block 1030, etc.

The I/O interface 1015 is a device that allows a user to send action requests and receive responses from the console 1090. An action request is a request to perform a particular action. For example, an action request may be an instruction to start or end capture of image or video data or an instruction to perform a particular action within an application. The I/O interface 1015 may include one or more input devices, such as a keyboard, a mouse, a game controller, or any other suitable device for receiving action requests and communicating the action requests to the console 1090. An action request received by the I/O interface 1015 is communicated to the console 1090, which performs an action corresponding to the action request. In some embodiments, the I/O interface 1015 includes an IMU that captures calibration data indicating an estimated position of the I/O interface 1015 relative to an initial position of the I/O interface 1015. In some embodiments, the I/O interface 1015 may provide haptic feedback to the user in accordance with instructions received from the console 1090. For example, haptic feedback can be provided when an action request is received, or the console 1090 communicates instructions to the I/O interface 1015 causing the I/O interface 1015 to generate haptic feedback when the console 1090 performs an action.

The console 1090 may provide content to the HMD 1000 for processing in accordance with information received from one or more of: the IMU 1010, the DCA 1011, the eye tracking system 1014, and the I/O interface 1015. In the example shown in FIG. 10B, the console 1090 includes an application store 1055, a tracking module 1060, and a processing module 1065. Some embodiments of the console 1090 may have different modules or components than those described in conjunction with FIG. 10B. Similarly, the functions further described below may be distributed among components of the console 1090 in a different manner than described in conjunction with FIGS. 10A and 10B.

The application store 1055 may store one or more applications for execution by the console 1090. An application is a group of instructions that, when executed by a processor, generates content for presentation to the user. Content generated by an application may be in response to inputs received from the user via movement of the HMD 1000 or the I/O interface 1015. Examples of applications include: gaming applications, presentation and conferencing applications, video playback applications, or other suitable applications.

The tracking module 1060 may calibrate the AR/VR system 1050 using one or more calibration parameters and may adjust one or more calibration parameters to reduce error in determination of the position of the HMD 1000 or the I/O interface 1015. Calibration performed by the tracking module 1060 also accounts for information received from the IMU 1010 in the HMD 1000 and/or an IMU included in the I/O interface 1015, if any. Additionally, if tracking of the HMD 1000 is lost, the tracking module 1060 may re-calibrate some or all of the AR/VR system 1050.

The tracking module 1060 may track movements of the HMD 1000 or of the I/O interface 1015, the IMU 1010, or some combination thereof. For example, the tracking module 1060 may determine a position of a reference point of the HMD 1000 in a mapping of a local area based on information from the HMD 1000. The tracking module 1060 may also determine positions of the reference point of the HMD 1000 or a reference point of the I/O interface 1015 using data indicating a position of the HMD 1000 from the IMU 1010 or using data indicating a position of the I/O interface 1015 from an IMU included in the I/O interface 1015, respectively. Furthermore, in some embodiments, the tracking module 1060 may use portions of data indicating a position or the HMD 1000 from the IMU 1010 as well as representations of the local area from the DCA 1011 to predict a future location of the HMD 1000. The tracking module 1060 provides the estimated or predicted future position of the HMD 1000 or the I/O interface 1015 to the processing module 1065.

The processing module 1065 may generate a 3D mapping of the area surrounding some or all of the HMD 1000 ("local area") based on information received from the HMD 1000. In some embodiments, the processing module 1065 determines depth information for the 3D mapping of the local area based on information received from the DCA 1011 that is relevant for techniques used in computing depth. In various embodiments, the processing module 1065 may use the depth information to update a model of the local area and generate content based in part on the updated model.

The processing module 1065 executes applications within the AR/VR system 1050 and receives position information, acceleration information, velocity information, predicted future positions, or some combination thereof, of the HMD 1000 from the tracking module 1060. Based on the received information, the processing module 1065 determines content to provide to the HMD 1000 for presentation to the user. For example, if the received information indicates that the user has looked to the left, the processing module 1065 generates content for the HMD 1000 that reflectors the user's movement in a virtual environment or in an environment augmenting the local area with additional content. Additionally, the processing module 1065 performs an action within an application executing on the console 1090 in response to an action request received from the I/O interface 1015 and provides feedback to the user that the action was performed. The provided feedback may be visual or audible feedback via the HMD 1000 or haptic feedback via the I/O interface 1015.

In some embodiments, based on the eye tracking information (e.g., orientation of the user's eyes) received from the eye tracking system 1014, the processing module 1065 determines resolution of the content provided to the HMD 1000 for presentation to the user on the electronic display 1025. The processing module 1065 may provide the content to the HMD 1000 having a maximum pixel resolution on the electronic display 1025 in a foveal region of the user's gaze. The processing module 1065 may provide a lower pixel resolution in other regions of the electronic display 1025, thus lessening power consumption of the AR/VR system 1050 and saving computing resources of the console 1090 without compromising a visual experience of the user. In some embodiments, the processing module 1065 can further use the eye tracking information to adjust where objects are displayed on the electronic display 1025 to prevent vergence-accommodation conflict and/or to offset optical distortions and aberrations.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A controller for a biresonant microelectromechanical system (MEMS) reflector, the controller configured for:
    oscillating the biresonant MEMS reflector about X and Y axes by providing driving signals to the biresonant MEMS reflector;
    obtaining information about tilt angles of the biresonant MEMS reflector at different moments of time;
    determining a parameter of a statistical model defining a probability distribution of tilt angles of the biresonant MEMS reflector as a function of the obtained information about the tilt angles of the biresonant MEMS reflector at the different earlier moments of time; and
    evaluating a tilt angle of the biresonant MEMS reflector based on the statistical model.

2. The controller of claim 1, configured for obtaining the information about the tilt angles of the biresonant MEMS at the different earlier moments of time by obtaining sync signals at the different earlier moments of time, the sync signals indicating a pre-determined tilt angle of the biresonant MEMS reflector at the different earlier moments of time.

3. The controller of claim 2, configured for obtaining the information about the tilt angles of the biresonant MEMS reflector at the different earlier moments of time by determining a phase of a resonant oscillation of the biresonant MEMS reflector at the different earlier moments of time.

4. The controller of claim 1, configured for obtaining the information about the tilt angles of the biresonant MEMS reflector at the different earlier moments of time by measuring tilt angles of the biresonant MEMS reflector about at least one of the X axis or the Y axis at the different earlier moments of time.

5. The controller of claim 1, configured for evaluating the tilt angle of the biresonant MEMS reflector based on a time difference between the different earlier moments of time when the biresonant MEMS reflector had a pre-determined tilt angle value.

6. The controller of claim 1 comprising a neural network configured to analyze the obtained information about the tilt angles of the biresonant MEMS reflector at the different earlier moments of time to determine the probability distribution of the statistical model.

7. A scanning projector display comprising:
    a light source for providing a light beam;
    a biresonant microelectromechanical system (MEMS) reflector optically coupled to the light source for scanning the light beam to provide an image in angular domain; and
    a controller operably coupled to the light source and the biresonant MEMS reflector and configured for:
        oscillating the biresonant MEMS reflector about X and Y axes by providing driving signals to the biresonant MEMS reflector;
        obtaining information about tilt angles of the biresonant MEMS reflector at different moments of time;
        determining a parameter of a statistical model defining a probability distribution of tilt angles of the biresonant MEMS reflector as a function of the obtained information about the tilt angles of the biresonant MEMS reflector at the different earlier moments of time;
        evaluating a tilt angle of the biresonant MEMS reflector based on the statistical model;
        determining which pixel of the image corresponds to the evaluated tilt angle of the biresonant MEMS reflector; and
        operating the light source at a power level corresponding to brightness of the pixel.

8. The scanning projector display of claim 7, wherein the biresonant MEMS reflector comprises a feedback circuit coupled to the controller and configured to provide sync signals thereto when a tilt angle of the biresonant MEMS reflector reaches a pre-determined value.

9. A method for controlling a microelectromechanical system (MEMS) reflector, the method comprising:
    oscillating the MEMS reflector about at least one axis by providing driving signals to the MEMS reflector;
    obtaining information about tilt angles of the MEMS reflector at different moments of time; and
    determining a parameter of a statistical model defining a probability distribution of tilt angles of the biresonant MEMS reflector as a function of the obtained information about the tilt angles of the biresonant MEMS reflector at the different earlier moments of time;
    evaluating a tilt angle of the MEMS reflector based on the statistical model.

10. The method of claim 9, wherein obtaining the information about the tilt angles of the MEMS reflector for evaluating the tilt angle of the MEMS reflector comprises obtaining sync signals at the different earlier moments of time, the sync signals indicating a pre-determined tilt angle of the MEMS reflector at the different earlier moments of time.

11. The method of claim 9, further comprising using a neural network to analyze the obtained information about the tilt angles of the biresonant MEMS reflector at the different earlier moments of time to determine the probability distribution of the statistical model.

12. The method of claim 11, wherein the neural network is configured to determine the probability distribution of the statistical model based on measurements of tilt angles of the biresonant MEMS reflector about X and Y axes performed in a test setup.

13. The method of claim 9, wherein the statistical model comprises a parametric model defining the tilt angle of the biresonant MEMS reflector as a function of the tilt angles of the biresonant MEMS reflector at the different earlier moments of time.

14. The method of claim 13, wherein the parametric model comprises a model defining cross-coupling between oscillations of the biresonant MEMS reflector about X and Y axes.

15. The method of claim 14, further comprising using a neural network to analyze the obtained information about the tilt angles of the biresonant MEMS reflector at the different earlier moments of time to determine a parameter of the model defining cross-coupling between oscillations of the biresonant MEMS reflector about X and Y axes.

* * * * *